3,356,745
USE OF ABSORPTION MEDIA CONTAINING PHENOL IN RECOVERY OF BENZENE FROM INERTS IN RASCHIG PROCESS
Arthur W. Kelly, Basking Ridge, N.J., assignor to Pullman Incorporated, Chicago, Ill., a corporation of Delaware
Filed July 17, 1964, Ser. No. 383,404
10 Claims. (Cl. 260—629)

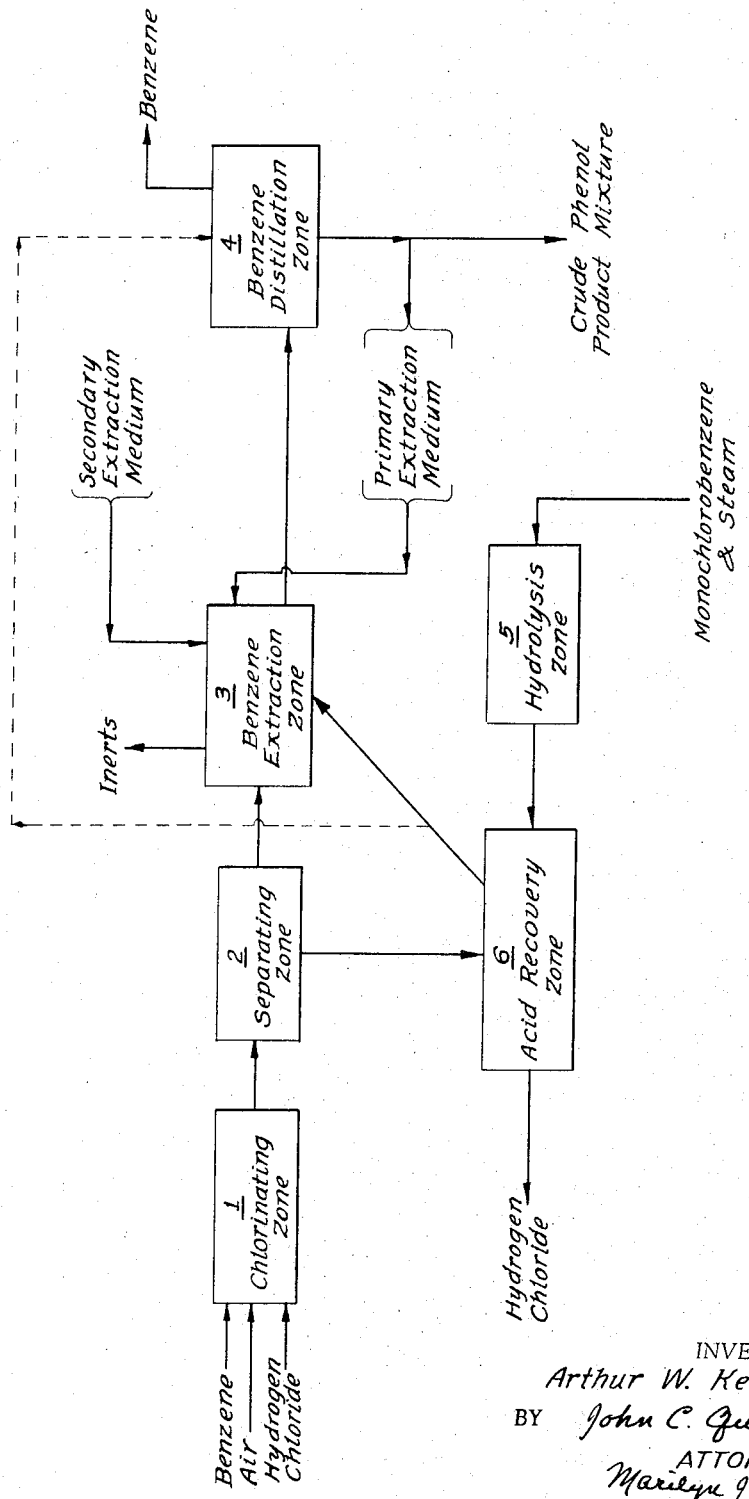

This application is a continuation-in-part of copending application Ser. No. 55,214, filed Sept. 12, 1960, now Patent No. 3,303,223.

This invention relates to a process for the manufacture of phenol and more particularly to the recovery of unconverted reactants in a phenol process. More specifically, this invention relates to the recovery of benzene in a process for producing phenol from benzene with chlorobenzene as an intermediate product.

Processes for producing phenol include the conversion of benzene into chlorobenzene by the action of hydrogen chloride and air or oxygen according to the equation:

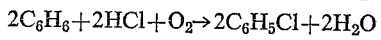

and the hydrolysis of the chlorobenzene to phenol according to the equation:

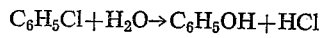

This process is commercially known as the Raschig process for producing phenol. In carrying out this process, a considerable amount of benzene remains unconverted in the chlorination zone and this unconverted benzene, together with benzene formed in later stages of the process, e.g., the hydrolysis stage, must be recovered for economical and efficient operation in accordance with the demands of commercial utilization.

Various methods of recovering benzene have been employed. For example, the immediate distillation of the reaction mixture leaving the chlorination zone, when the process is carried out at high pressures, has been attempted; however, this practice has not proven satisfactory because of the difficulty of containing corrosive acid in the system at elevated pressures. To circumvent this difficulty, the recovery of benzene was postponed to the final stage of phenol purification; however, due to circulation and vaporization, much of the benzene is lost in this method of recovery. Other methods for recovering benzene with liquid absorbents have proven prohibitive due to the amount and cost of a suitable absorbent or have resulted in the formation of azeotropic mixtures which are difficult to separate from benzene.

It is, therefore, an object of the present invention to provide a more efficient process for the manufacture of phenol, which overcomes the difficulties enumerated above.

Another object of this invention is to provide a phenol synthesis process wherein complete recovery of benzene is achieved.

Another object of the present invention is to provide a simplified process having a reduced number of treating steps and apparatus associated therewith as compared to processes heretofore employed.

Other objects and advantages of the present invention will become apparent to those skilled in the art from the following description and disclosure.

According to the process of the present invention, a major portion of the benzene present in the phenol synthesis process is concentrated in a single benzene treating or distillation unit by passing to the treating zone a mixture comprising the combined, acid-free halogenation effluent obtained from the reaction of benzene with air and a hydrogen halide, in the first stage of the process and the acid-free hydrolysis effluent obtained from the hydrolysis of monohalobenzene to phenol in the second stage of the process. By means of this process, a major portion of the benzene is recovered from the system before the liquid effluent from the halogenation zone is subjected to hydrolysis; thus, the volume of material circulated through most of the apparatus employed in the process, is greatly reduced and the overall process is more efficient.

Also, according to the present process, inert materials are vented from the system without loss of the primary organic reactants by extracting benzene from inerts prior to entry into the treating or distillation zone, with a liquid extraction mixture containing phenol and halobenzenes. Generally between about 20 weight percent and about 50 weight percent of the fresh benzene feed and benzene distillation recycle in the chlorination zone is so treated in the extractor, although this amount may be varied from between about 3 percent by weight to about 60 percent by weight, if desired. The extraction mixture is preferably the liquid effluent from the treating zone, i.e., the phenol product mixture, which selectively absorbs only the organic components in the extractor and which is substantially free of water, acid and benzene.

Referring to the accompanying diagram which is a flow-sheet of the steps in the recovery of a phenol product mixture from the aforementioned reactions and in which the unitary processing stages are designated for greater clarity by rectangular blocks bearing identifying legends, it is to be understood, of course, that pumps or blowers and other apparatus may be employed between the stages for transporting materials from one stage to another, at the desired conditions of temperature and pressure, and other minor operations involving the reactants may be interposed between the stages.

Generally the reaction of a hydrogen halide, for example hydrogen chloride, with oxygen or air and benzene is carried out in the presence of a metal catalyst, at a temperature of between about 150° C. and about 400° C. under a pressure from below atmospheric to about 100 p.s.i.g., preferably at between about 200° C. and about 300° C. and under a slight negative pressure. The metal catalyst employed to promote the chlorination is usually a metal halide, e.g., iron chloride or copper chloride, when the hydrogen halid reactant is hydrogen chloride. When hydrogen bromide is employed, the corresponding brominated catalyst can be employed. This reaction in halogenation or chlorination zone 1 results in a mixture of mono- and polyhalogenated, or preferably chlorinated, benzenes together with a substantial quantity of unconverted benzene and aqueous acid and, because a small amount of oxidation takes place, oxides of carbon, nitrogen, and water are also present in this mixture. This mixture, which under preferred conditions is in the vapor phase, is then subjected to a crude separation in fractionation separation zone 2, for the removal of a vaporous benzene fraction from a liquid organic-acid fraction. As pointed out above, preferred conditions in the halogenation zone include operation under a slightly negative pressure resulting in a vaporous product mixture. When this halogenation effluent is in the vapor phase, the organic-acid fraction is condensed from the benzene fraction in tower 2. Whether condensation or distillation is employed, a portion of the vaporous benzene fraction thus separated can be directly recycled to the halogenation zone, if desired. Accordingly, all, or the remaining portion of the benzene fraction is passed to extraction tower or zone 3 wherein it is contacted with the novel liquid extraction medium of the present process at a temperature in the top of a packed or multi-trayed tower of between about 30° F. and about 200° F. under a pressure of from about 5 p.s.i.a. to about 100 p.s.i.g., preferably at between about 75° F. and about 120° F., under from about 0 p.s.i.g. to about 30 p.s.i.g. The resulting liquid extraction mixture, containing the benzene absorbed in zone 3, is then passed to a distillation zone 4, also a packed or multi-trayed tower, wherein a benzene fraction of between about 50 weight percent and about 100 weight percent concentration, containing water vapor if desired, is recovered as a vaporous overhead fraction at a temperature between about 120° F. and about 400° F. under from about 5 p.s.i.a. to about 100 p.s.i.g., preferably at between about 120° F. and about 270° F. under from about 5 p.s.i.a. to about 30 p.s.i.g. If desired, this vaporous fraction can be recycled to the halogenating zone 1 or can be further dehydrated by passing the vapors over a drying material such as sulfuric acid, calcium chloride, silica, alumina, dry copper sulfate crystals, etc., and then passed to halogenating or chlorinating zone 1. When the halogenation is carried out in the liquid phase, the benzene must additionally be condensed before recycle.

The liquid material removed from the bottom of the distillation zone comprises the phenol product mixture containing, in addition to phenol, mono- and polyhalobenzenes from which phenol is subsequently removed as the product of the process. A portion of this phenol product mixture is conveniently and preferably employed as the liquid extraction medium for the extraction of benzene in zone 3.

In the second stage of the process a mixture containing a halobenzene and water is then hydrolyzed in zone 5 at a temperature of between about 400° C. and about 650° C. under from about 5 p.s.i.a. to about 100 p.s.i.g., preferably at between about 450° F. and about 550° F. over a highly surface active catalyst such as alumina, silica gel, which may be promoted with copper, nickel or cobalt or any other suitable promoting agent. Other suitable catalysts which may be employed at this stage of the process include aluminum hydrosilicate, tricalcium phosphate and catalysts mentioned in U.S. Patent 1,966,281 and U.S. Patent 1,961,834. Preferred conditions of operation in the hydrolysis stage include vapor phase reaction over a copper promoted catalyst.

The resulting hydrolysis mixture, which is preferably a vaporous mixture containing phenol in about 5 percent to about 25 percent concentration is then condensed and admixed with the liquid organic-acid reaction mixture, from which a vaporous benzene fraction has been removed in the crude separation stage 2. This mixture is then treated for the removal of the halo acid and a portion of the water in zone 6. The aqueous acid fraction can then be returned to the halogenation zone as at least a part of the feed thereto, if desired.

The remaining acid-free mixture is then passed either to the benzene distillation zone 4, illustrated by the broken line, and/or the benzene extraction zone 3 mentioned above. Thus, substantially all of the benzene in the mixture is concentrated in the distillation zone and is recovered.

When the acid-free mixture is passed to extraction zone 3, the entire amount of benzene present in the process may be extracted for removal of the inert materials; however, when the acid-free mixture is passed directly to the benzene distillation zone 4, only the vaporous benzene fraction passed to the extractor from separation zone 2 can be treated for removal of inerts. The latter method of flow is preferred over the former when the partial pressure of benzene over the acid free mixture approaches or exceeds the partial pressure of vaporous benzene fraction from zone 2.

The extraction medium of the present process comprises a liquid mixture of between about 30 weight percent to about 95 weight percent monohalobenzene; between about 5 weight percent and about 30 weight percent phenol and about 0 weight percent to about 65 weight percent polyhalobenzene. The halo compounds in the extraction medium are preferably chlorinated compounds and the preferred synthesis reactions are also carried out with chlorinated compounds. This extraction medium, which is herein referred to as the primary extraction liquid, enters benzene extractor at a temperature of between about 30° F. and about 150° F., preferably between about 80° F. and about 120° F.

While it is usually more convenient to employ the liquid effluent from zone 4 as the primary extraction medium, it is also to be understood that a suitable extraction mixture having the above composition can be independently prepared for use in zone 3.

The extraction medium is employed in a mole ratio of between 2:1 and 20:1, preferably between 3:1 and 10:1 based on the amount of extraction liquid to the amount of benzene present in the extraction zone. It is also preferred that the vaprous benzene in the extraction zone is scrubbed with the primary extraction liquid at the pressures and temperatures hereinabove described while a secondary extraction liquid is fed to the upper portion of the extraction zone for recovery of any vaporized or unabsorbed monohalobenzene during the extraction operation. This secondary extraction liquid may be any organic compound, heavier than benzene, which is suitable for absorbing organic components which are vaporized in the extractor under the conditions of operation in order that the only vapor removed from said extractor is inert materials which accumulate in the process, for example, nitrogen and oxides of carbon. The accumulation of these inert materials is particularly prevalent when air is employed in the halogenation zone. The secondary extraction liquid is preferably a material which is at least not detrimental to the hydrolysis reaction in order that this liquid may be recycled to the hydrolysis zone when monohalobenzene and polyhalobenzenes are absorbed in the liquid.

The suitable secondary extraction liquids include the following: polychlorobenzenes, phenol, naphtha, $C_9$ to $C_{14}$ paraffin hydrocarbons, polybromobenzenes or mixtures thereof which contain phenol as mixtures including polychlorobenzenes being the most preferred since their presence in the hydrolysis zone leads to the further production of monochlorobenzene, which is subject to conversion to phenol (described by N. N. Vorozhtzov, Jr., et al., Compt. Rend, Acad. Sci. URSS, 1933/221–3).

When two or more extraction liquids are employed in the extraction zone, it is preferred that the lower boiling liquid be introduced at a portion of the tower above the high boiling liquid in order that components which escape being absorbed by the latter will be recovered by the lower boiling extraction agent.

It has been found that the thermodynamic efficiency in the process for separating benzene may be enhanced by passing the extraction medium in indirect heat exchange with the liquid effluent from the benzene extraction zone. However, in most cases, the extraction medium requires further cooling before entering the benzene extractor and the stream passing to and from the extraction zone may be independently cooled and heated, if desired.

It is also to be understood that, in place of removing the primary and secondary extraction mixtures from the extraction zones as separate liquid streams and venting inert materials as a vaporous effluent, the secondary extraction mixture can be vaporized and removed with the inerts from the extraction zone. In this case, the extraction tower can be refluxed with the condensed secondary extraction mixture while the inerts are vented therefrom or the condensate from which inerts have been vented may be employed in another stage of the process. Otherwise, when the only vapors emerging from the tower consist essentially of inert materials, reflux is not employed.

Reference is now had to the following example which is presented to more fully illustrate the process of the present invention, but is not to be interpreted as limiting to the scope of the invention herein described.

*Example*

Into an extraction tower is fed, at a rate of 7,000 pounds per hour, at an overall temperature of about 100° F., a gaseous inert mixture containing the equilibrium concentrations of water and benzene for this temperature under from 2 to 3 p.s.i.g. pressure. The vaporous fraction contains about 3 percent by weight of water and about 50 percent by weight of benzene. Inert materials comprising CO, $CO_2$ and $N_2$, are present from the vapor phase reaction of benzene with oxygen and hydrogen chloride after separation of vapors from a liquid chlorination effluent fraction containing water, hydrogen chloride, benzene, chlorobenzene, and other organic products of the reaction. The extraction tower is maintained under a pressure of from 1 p.s.i.g. to 2 p.s.i.g. with a bottom temperature of 150° F. and a top temperature of 85° F.

Into a hydrolysis chamber is fed a vaporous mixture containing monochlorobenzene, steam and a minor amount of polychlorobenzene at a rate of 40,000 pounds per hour at a temperature of about 500° F. The conversion products from the hydrolysis chamber containing phenol, hydrogen chloride and some benzene, together with unconverted amounts of mono- and polychlorinated benzenes and water are then treated to remove about a 15 percent hydrochloric acid solution as a liquid. The liquid organic effluent comprising about a 34–16–34–16 weight percent mixture of monochlorobenzene, phenol, benzene and polychlorobenzenes is passed, at a temperature of 100° F., to the benzene extraction zone wherein it is admixed with the vaporous benzene-water fraction from said separation zone.

The liquid material in the benzene extractor is washed with a liquid primary extraction medium containing about 18 weight percent phenol, 70 weight percent monochlorobenzene and 12 percent polychlorobenzenes, which liquid medium enters the extractor at a temperature of about 100° F. The benzene present in the extractor is absorbed in the primary extraction medium and is removed from the bottom thereof, passed in indirect heat exchange with the incoming extraction medium and introduced into a benzene distillation zone wherein, at a temperature of about 218° F. and a pressure of 14 p.s.i.a., a benzene-water fraction is removed overhead as a vaporous effluent and recycled to the chlorination zone, while the liquid fraction having the composition given above for the extraction medium is removed from the bottom of the distillation zone as the liquid phenol product effluent therefrom. Approximately one-half of this liquid effluent is employed as the primary extraction medium in the above extraction, while the remaining portion is passed to a series of distillation zones for recovery of pure phenol.

Into the benzene extractor is also introduced approximately 3,500 pounds per hour of a liquid mixture of dichlorobenzene and phenol as the secondary extraction medium. This secondary liquid which enters the extractor at a temperature of 85° F. serves to recover a small amount of monochlorobenzene (about 1.5 weight percent) which has vaporized or failed to be absorbed in the primary extraction medium during the extraction operation. About 3,500 pounds per hour of inert gases comprising carbon monoxide, carbon dioxide and nitrogen are vented from the top of the extraction zone to prevent build up of inert materials in the system. The secondary extraction liquid, together with the material absorbed therein, is then removed as a liquid from the extractor.

The benzene losses, e.g., losses due to vaporization, in the process of this example are reduced to trace amounts in the present system or about 100 percent recovery of unconverted benzene is realized after the chlorination reaction in the overall process.

It is to be understood that many modifications and variations of the above-described process can be made without departing from the scope of this invention; for instance in the above example, hydrogen bromide may be substituted for hydrogen chloride in the halogenation zone and monobromobenzene may be employed in the hydrolysis zone to provide the corresponding brominated compounds in the manner set forth above.

Having thus described my invention I claim:

1. In a process for the production of phenol wherein benzene is reacted with a halogen ion and oxygen to produce a reactor effluent containing halobenzenes in admixture with unconverted benzene and inert materials, the monohalobenzene and any halogen acid is separated from the reactor effluent, and monohalobenzene is hydrolyzed with steam to produce phenol and hydrogen halide, the improvement for recovering benzene and preventing accumulation of inert materials which comprises: extracting the vaporous halogen acid free benzene mixture in an extraction column with a liquid mixture comprising between about 20 and about 95 weight percent monohalobenzene, between about 0 and about 65 weight percent dihalobenzene and between about 5 and about 30 weight percent phenol, selectively absorbing the organic components of the benzene mixture in the liquid, venting vaporous inert materials from the top of the column and withdrawing and distilling the resulting liquid extraction medium to recover a vaporous benzene fraction.

2. In a process for the production of phenol wherein benzene is reacted with a hydrogen halide in the presence of oxygen to produce a halogenation effluent containing mono- and polyhalobenzenes in admixture with unconverted benzene and inert materials, a vaporous benzene fraction containing inert materials is separated from a liquid organic-acid fraction containing monohalobenzene, the monohalobenzene is hydrolyzed to produce a hydrolysis effluent containing halobenzenes, phenol and the corresponding hydrogen halide and the hydrolysis effluent is treated for removal of the hydrogen halide, the improvement for recovering benzene and preventing accumulation of inert inorganic materials in the process which comprises: extracting the benzene-inert mixture from which monohalobenzene has been removed in an extraction zone with a liquid mixture comprising mono- and dihalobenzenes and phenol, selectively absorbing the organic components of the benzene mixture in the extraction liquid, venting the vaporous inert material from the extraction zone, distilling the resulting liquid extraction medium with absorbed organic components in admixture with the hydrolysis effluent from which hydrogen halide has been removed to recover a vaporous benzene fraction and a liquid product mixture containing phenol and mono- and dihalobenzenes, and passing at least a portion of the liquid product mixture to the extraction zone as the liquid extraction mixture.

3. The process of claim 2 wherein the extraction is carried out at a temperature in the top of the column of between about 30° F. and about 200° F. under a pressure of from about 5 p.s.i.a. to about 100 p.s.i.g.

4. In a process for the production of phenol wherein benzene is reacted with hydrogen chloride in the presence of oxygen to produce a chlorination effluent containing mono- and polychlorobenzenes in admixture with unconverted benzene and inert materials, a vaporous benzene fraction containing inert materials is separated from a liquid organic-acid fraction containing monochlorobenzene and the monochlorobenzene is hydrolyzed to produce a hydrolysis effluent containing chlorobenzenes, phenol and hydrogen chloride, the improvement for recovering benzene and preventing the accumulation of inert gaseous materials in the process which comprises: after separating the vaporous fraction containing benzene and inert materials from the chlorination effluent, passing the chlorination effluent from which said benzene fraction has been removed and said hydrolysis effluent to an acid separation zone wherein hydrochloric acid and water are removed, passing the benzene fraction to an extraction zone, extracting the benzene fraction with a liquid extraction medium comprising mono- and dichlorobenzenes and phenol, absorbing the organic components of the benzene fraction in the extraction liquid, venting the vaporous, inert material from the extraction zone, passing the resulting extraction liquid containing the absorbed organic components to a distillation zone wherein a vaporous benzene fraction and a liquid product mixture containing phenol and mono- and dichlorobenzenes are separated, passing the deacidified liquid from the acid separation zone to said distillation zone for distillation with the extraction liquid and absorbed organic components, passing a portion of the liquid product mixture from the distillation zone to the extraction zone as the extraction liquid for the recovery of benzene and recovering phenol from the remaining portion of the liquid product mixture.

5. The process of claim 4 wherein a minor amount of monochlorobenzene is vaporized and withdrawn from the extraction zone with the inert material, the monochlorobenzene is condensed and the inerts vented as vapors therefrom.

6. The process of claim 5 wherein the condensate is recycled as reflux to the extraction zone.

7. In a process for the production of phenol wherein benzene is reacted with hydrogen chloride in a chlorination zone in the presence of oxygen to produce a chlorination effluent containing chlorobenzenes in admixture with unconverted benzene and inert materials, a vaporous benzene fraction containing inert materials is separated from a liquid organic-acid fraction containing monochlorobenzene and the monochlorobenzene is hydrolyzed to produce a hydrolysis effluent containing chlorobenzene, phenol and hydrogen chloride, the improvement for recovering benzene and preventing the accumulation of inert gaseous materials in the process which comprises: after separating the vaporous fraction containing benzene and inert materials from the chlorination effluent, passing the chlorination effluent from which said benzene fraction has been removed and said hydrolysis effluent to an acid separation zone wherein hydrogen chloride and water are removed, passing the benzene fraction to an extraction zone, extracting the benzene from the vaporous benzene fraction with a primary extraction medium comprising mono- and dichlorobenzenes and phenols, absorbing a major portion of the vaporous organic components of the benzene fraction in the primary extraction medium, extracting any remaining portion of the vaporous organic components of the benzene fraction and any organic components vaporized from the first extraction medium with a secondary extraction medium, venting the vaporous inert materials from the extraction zone, passing the resulting primary extraction mixture and absorbed components to a distillation zone wherein a vaporous benzene fraction is separated from a liquid product mixture containing phenol and halobenzenes, recycling the benzene fraction as feed to the chlorination zone, passing the deacidified liquid from the acid separation zone to said distillation zone for distillation with the extraction liquid and absorbed components, passing a portion of the liquid product mixture from the distillation zone to the extraction zone as the primary extraction medium, and recovering phenol from the remaining portion of the liquid product mixture.

8. The process of claim 7 wherein the condensate which is the secondary extraction medium and any organic material absorbed therein, is employed as reflux to the extraction zone.

9. The process of claim 7 wherein the secondary extraction medium comprises a chlorobenzene which remains in the liquid phase during the extraction and wherein the secondary extraction medium is also passed to the distillation zone.

10. In a process for the production of phenol wherein benzene is reacted with hydrogen halide in the presence of oxygen to produce a halogenation effluent containing mono- and polyhalobenzenes in admixture with unconverted benzene and inert materials, a vaporous benzene fraction containing inert materials is separated from a liquid organic-acid fraction containing monohalobenzene, and the monohalobenzene is hydrolyzed to produce a hydrolysis effluent containing halobenzenes, phenol and the corresponding hydrogen halide, and the hydrolysis effluent is treated for the removal of hydrogen halide the improvement for recovering benzene and preventing accumulation of inert inorganic materials in the process which comprises: extracting the benzene-inert mixture from which monohalobenzene has been removed in an extraction zone with a liquid mixture comprising mono- and dihalobenzenes and phenol, selectively absorbing the organic components of the benzene mixture in the extraction liquid wherein at least a portion of the liquid consists of the hydrolysis effluent from which hydrogen halide has been removed, venting the vaporous inert material from the extraction zone, distilling the resulting liquid extraction medium with absorbed organic components to recover a vaporous benzene fraction and a liquid product mixture containing phenol and mono- and dihalobenzenes and passing at least a portion of the liquid product mixture to the extraction zone as the extraction medium.

References Cited

UNITED STATES PATENTS

| | | | |
|---|---|---|---|
| 1,858,521 | 5/1932 | Putnam | 260—650 |
| 2,035,917 | 3/1936 | Prahl et al. | 260—629 |
| 2,156,402 | 5/1939 | Prahl | 260—629 |
| 2,988,573 | 6/1961 | Siebentritt et al. | |

FOREIGN PATENTS

| | | |
|---|---|---|
| 1,304,757 | 8/1962 | France. |
| 937,272 | 9/1963 | Great Britain. |

LEON ZITVER, *Primary Examiner.*

BERNARD HELFIN, *Examiner.*

J. E. EVANS, *Assistant Examiner.*